(12) United States Patent
Matsumura et al.

(10) Patent No.: US 7,508,381 B2
(45) Date of Patent: Mar. 24, 2009

(54) DISPLAY APPARATUS

(75) Inventors: Kazuyuki Matsumura, Kobe (JP); Hiroyuki Asada, Kobe (JP); Takashi Ota, Kobe (JP); Takeshi Konuma, Kobe (JP); Yasuhiro Sakakibara, Nishikasugai-gun (JP); Akiyoshi Nagano, Nishikasugai-gun (JP); Etsuo Ozawa, Nishikasugai-gun (JP); Minoru Shibata, Nishikasugai-gun (JP)

(73) Assignees: Fujitsu Ten Limited, Hyogo (JP); Toyoda Gosei Co., Ltd., Aichi (JP)

( * ) Notice: Subject to any disclaimer, the term of this patent is extended or adjusted under 35 U.S.C. 154(b) by 313 days.

(21) Appl. No.: 10/677,261

(22) Filed: Oct. 3, 2003

(65) Prior Publication Data
US 2004/0140959 A1 Jul. 22, 2004

(30) Foreign Application Priority Data
Oct. 4, 2002 (JP) ............................ P2002-292464

(51) Int. Cl.
G09G 5/00 (2006.01)
(52) U.S. Cl. ...................................... 345/173
(58) Field of Classification Search .................. 345/148
See application file for complete search history.

(56) References Cited

U.S. PATENT DOCUMENTS

| | | | | |
|---|---|---|---|---|
| 4,521,078 A * | 6/1985 | Baeger | ........................ | 349/96 |
| 6,130,665 A * | 10/2000 | Ericsson | ...................... | 345/173 |
| 6,527,555 B1 * | 3/2003 | Storm | ......................... | 434/131 |
| 6,621,471 B1 | 9/2003 | Ozaki et al. | | |
| 6,710,754 B2 * | 3/2004 | Hanson et al. | ............... | 345/2.1 |
| 2002/0067366 A1 * | 6/2002 | Hirao et al. | ................. | 345/660 |
| 2004/0036952 A1 * | 2/2004 | Wright | ....................... | 359/296 |

FOREIGN PATENT DOCUMENTS

| | | |
|---|---|---|
| JP | 9-44307 | 2/1997 |
| JP | 11-065764 | 3/1999 |
| JP | 2000-180188 | 6/2000 |
| JP | 2000-329577 | 11/2000 |
| JP | 2000-331557 | 11/2000 |
| JP | 2000329577 | * 11/2000 |
| JP | 2000331557 | * 11/2000 |
| JP | 2001-083913 | 3/2001 |
| JP | 2002-225724 | 8/2002 |

* cited by examiner

*Primary Examiner*—Sumati Lefkowitz
*Assistant Examiner*—Tammy Pham
(74) *Attorney, Agent, or Firm*—Wenderoth, Lind & Ponack, L.L.P.

(57) ABSTRACT

In an on-board display apparatus, a transmission type display device is provided in front, displays a touch switch display when necessary, and operates as a touch panel. The transmission type display device can be turned to be transparent, and an image display device is provided rearward of the transparent portion. Since the display screen of the image display device toward the back, the visual range is long, and visibility can be improved. Since the display screen of the image display device and the display screen of the transmission type display device are not on the same plane, even if the touch switch display is touched by a finger, an image can be seen, and a pointer can be displayed on the display screen of the image display device in a position corresponding to the touched position.

34 Claims, 5 Drawing Sheets

FIG. 5

DISPLAY APPARATUS

BACKGROUND OF THE INVENTION

1. Field of the Invention

The present invention relates to a display apparatus, in particular, a display apparatus having excellent operability and design when this display apparatus is provided in an instrument panel or the like.

2. Description of the Related Art

Conventionally, equipment providing image display such as a navigation apparatus has been mounted in the vicinity of the driver's seat in a vehicle. A display apparatus provided with a touch panel is used to display roadmap images and receive an operation input, utilizing limited space in the vicinity of the driver's seat (e.g., see Japanese Laid-Open Patent Publication No. 9-44307 (page 3, FIG. 4)). An input operation using a touch panel is easier than an operation with a keyboard or a remote controller.

A touch panel is made of, for example, a transparent resistive film, and detects a position by utilizing a contact pressure that reduces the resistance value. Images for operation such as buttons are displayed in the display apparatus in order to indicate which portion of the touch panel an operator should touch. The display apparatus provided with a touch panel also displays images on the surface side of the on-board equipment, which is required by the operation.

In the display apparatus provided with a touch panel, a button or the like is constantly displayed in an area provided exclusively for the button on the images, or is displayed on the images when necessary. In the case where a button or the like is constantly displayed in an area provided exclusively for the button, the size of the area on which roadmap images are displayed in a navigation apparatus is restricted by the area on which a button or the like is displayed. In the case where a button or the like is displayed when necessary, when a finger or the like touches the button displayed on the images, the images are hid by the finger or the like, which deteriorates visibility. Furthermore, it is necessary to switch the presence or the absence of the button on the same display screen, so that control of image display becomes complicated.

Furthermore, in conventional on-board display equipment, images are displayed in a position closest to a driver on the surface of the on-board equipment, so that the driver, driving while looking into a distance around the vehicle during running, switches visual focus to a short distance to watch images, for example, when the vehicle is stopped, and the line of sight is shifted significantly to watch the images. Therefore, the eyes easily get tired.

SUMMARY OF THE INVENTION

It is an object of the present invention to provide a display apparatus that can improve visibility and operability.

The invention provides a display apparatus comprising a transmission type display portion provided with a touch panel function. A display portion is provided on a rearward side of the transmission type display portion such that the display portion can be seen through the transmission type display portion. A control portion controls the transmission type display portion and the display portion.

In the invention it is preferable that a touch panel element is provided on a surface of the transmission type display portion.

In the invention it is preferable that the transmission type display portion includes a touch panel element inside.

The invention further provides a display apparatus comprising a transmission type display portion that is provided with a touch panel function and can display an image on a transparent surface. A display portion is provided apart from the transmission type display portion and displays an image on a rearward side of the transmission type display portion. A control portion controls a displayed content of the transmission type display portion and the display portion.

In the invention it is preferable that the display of the display portion is changed depending on a touched position on a touch panel on the transmission type display portion.

In the invention it is preferable that the touched position is displayed in the form of a button.

In the invention it is preferable that the displayed button is displayed in a position that does not prevent a view of the display portion.

In the invention it is preferable that the control portion controls such that a pointer is displayed in the display portion in accordance with an operation of the touch panel.

In the invention it is preferable that the display apparatus further comprises an approach detecting portion for detecting an operation object. The control portion changes an image displayed on at least one of the transmission type display portion and the display portion when an approach of the operation object is detected.

In the invention it is preferable that the approach detecting portion can detect an approach direction of the operation object.

In the invention it is preferable that the display apparatus is mounted on a vehicle.

In the invention it is preferable that the display apparatus is mounted on a vehicle, and the approach detecting portion distinguishes whether the operation object is approaching in a direction from the driver's seat or a passenger seat.

In the invention it is preferable that the transmission type display portion is constituted by a curved surface.

In the invention it is preferable that the transmission type display portion covers the display portion such that the display portion can be seen.

In the invention it is preferable that the display apparatus is provided in a middle portion between a driver set and a passenger seat.

In the invention it is preferable that the display apparatus further comprises an operation switch adjacent to the transmission type display portion. The operation switch is displayed selectively in the transmission type display portion.

In the invention it is preferable that the transmission type display portion has a curved plate shape, and an inclination angle with respect to a floor surface of a vehicle is larger in a lower portion than in an upper portion of the transmission type display portion.

In the invention it is preferable that the transmission type display portion has a curved plate shape, and the display portion is a flat plate shape.

In the invention it is preferable that the transmission type display portion is formed of an organic EL layer, and the display portion is formed from a liquid crystal display apparatus.

In the invention it is preferable that a display area of the transmission type display portion is larger than that of the display portion.

In the invention it is preferable that a portion of the transmission type display portion is turned to be transparent so that display of the display portion can be seen.

In the invention it is preferable that display of an operation switch displayed in the transmission type display portion is controlled such that the display appears or disappears gradually.

In the invention it is preferable that display of the transmission type display portion is controlled so as to be selectively opaque so that the display portion cannot be seen.

In the invention it is preferable that display of the transmission type display portion is provided pivotally with one end thereof as a supporting point.

The invention further provides an on-board display apparatus which is mounted on a vehicle, comprising a transmission type display portion is provided at a forward position and is substantially planar, capable of displaying a varied state between an opaque state and a transparent state. A rearward display portion is provided rearward of the transmission type display portion, while being spaced apart from the transmission type display portion, for performing a display. A display control portion displays a switch operation guide in the transmission type display portion. A touch detecting portion is provided in the transmission type display portion for detecting a touched position by a touching operation of an operator. An operation signal output portion outputs an operation signal indicating an operation content based on, a display state of the display control portion and a touch detection output from the touch detecting portion. The transmission type display portion functions as a touch panel and covers the rearward display portion such that an image thereof can be seen.

According to the present invention, an on-board display apparatus is provided, for example in the vicinity of the driver's seat of a vehicle, includes a transmission type display portion, a rearward display portion, a touch detecting portion, a display control portion, and an operation signal output portion. The transmission type display portion is provided at a forward position and is substantially planar, and can display in a varied state, that is, in an opaque state and a transparent state. The backward display portion is provided rearward of the transmission type display portion while being spaced apart from the transmission type display portion so as to be covered by the transmission type display portion, and displays such that an image thereof can be seen. The touch detecting portion is provided in the transmission type display portion and detects a touched position by a touching operation of an operator. The display control portion displays a switch operation guide in the transmission type display portion. The operation signal output portion outputs an operation signal indicating the operation content based on a touch detection output from the touch detecting portion. The display control portion controls the transmission type display portion so as to function as a touch panel, and turns the transmission type display portion to be transparent so that display by the rearward display portion can be seen. An operation input as a touch panel is performed with the transmission type display portion and the touch detecting portion, and display is performed by the rearward display portion rearward of the transmission type display portion, so that the display as a touch panel can be performed not on the same screen as the display of the rearward display portion. The display control portion does not have to display a guiding image as a touch panel on the display screen of the rearward display portion, so that a complicated control of image display can be avoided. An image displayed by the rearward display portion is positioned back from the transmission type display portion, so that the visual range of the driver is more distant than when it is on the surface, so that a burden when watching the image can be reduced.

According to the present invention, display and input for operation as a touch panel are performed at a forward side with the transmission type display portion and the touch detecting portion, and image display for operation is performed by the rearward display portion through a portion that can be turned to be transparent of the transmission type display portion. Therefore, the display of the rearward display portion is not entirely covered by the display of the transmission type display portion, and thus the operability can be improved. The display screen of the rearward display portion is positioned back, apart from the forward side in which the transmission type display portion is provided, and therefore the visual range from the driver or the like is distant and the visibility can be improved.

In the invention it is preferable that the display control portion controls such that a pointer is displayed on the display screen of the rearward display portion such that the pointer is in a position corresponding to the touched position when a touch is detected by the touch detecting portion.

According to the present invention, when the surface of the transmission type display portion is touched, a pointer is displayed on the display screen of the rearward display portion rearward from the surface of the transmission type display portion such that the pointer is in a position corresponding to the touched position. Therefore, in the case where it is necessary to designate a position on the images displayed by the rearward display portion, the position of the pointer is guided and an exact position can be designated.

According to the present invention, when the surface of the transmission type display portion is touched, pointer is displayed on the rearward display screen such that the pointer is in a position corresponding to the touched position. Therefore, even if a position on the imaged displayed by the rearward display portion cannot be designated by directly touching the position, an exact position can be designated by guiding the position of the pointer.

In the invention it is preferable that the on-board display apparatus further comprises an approach detecting portion for detecting an approach of an operation object, wherein the display control portion displays the switch operation guide in the transmission type display portion when the approach of the operation object is detected by the approach detecting portion.

According to the present invention, when an operation object such as a finger approaches, the operation guide is displayed in the transmission type display portion. Therefore, when the operation object does not approach, the operation guide is not displayed, and the transmission type display portion is transparent so that the displayed image on the rearward display portion can be seen well, and thus the visibility can be increased. The operation guide is displayed only when an operation is necessary, so that easy operation input can be performed.

Furthermore, according to the present invention, the image for operation is not displayed so that a transparent state is created, when necessary, and therefore the displayed image of the backward display portion can be seen well, and thus the visibility can be increased. When an operation is necessary, the image for operation is displayed, so that easy operation input can be performed.

In the invention it is preferable that the approach detecting portion also can detect an approach direction of the operation object. The display control portion switches images to be displayed in at least one of the transmission type display portion and the rearward display portion based on the approach direction of the operation object detected by the approach detecting portion.

According to the present invention, since the driver's seat is in a direction with respect to the position of the on-board display apparatus that is predetermined for each vehicle, if the approach direction of the operation object approaching for operation is detected, it is easily determined whether the operation is from, for example, the driver or a passenger. In at least one of the transmission type display portion and the image display portion, images are switched between images for the driver and the passenger, based on the determined results, so that appropriate images for each of them can be displayed. For example, for the driver, only the minimum image display may be displayed so that the driver can concentrate on driving. For the passenger, images may be displayed in colorful representation to show as much information as possible.

Furthermore, according to the present invention, it is easily determined whether the operation is from the driver or a passenger, and an appropriate image can be displayed in accordance with the operator.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
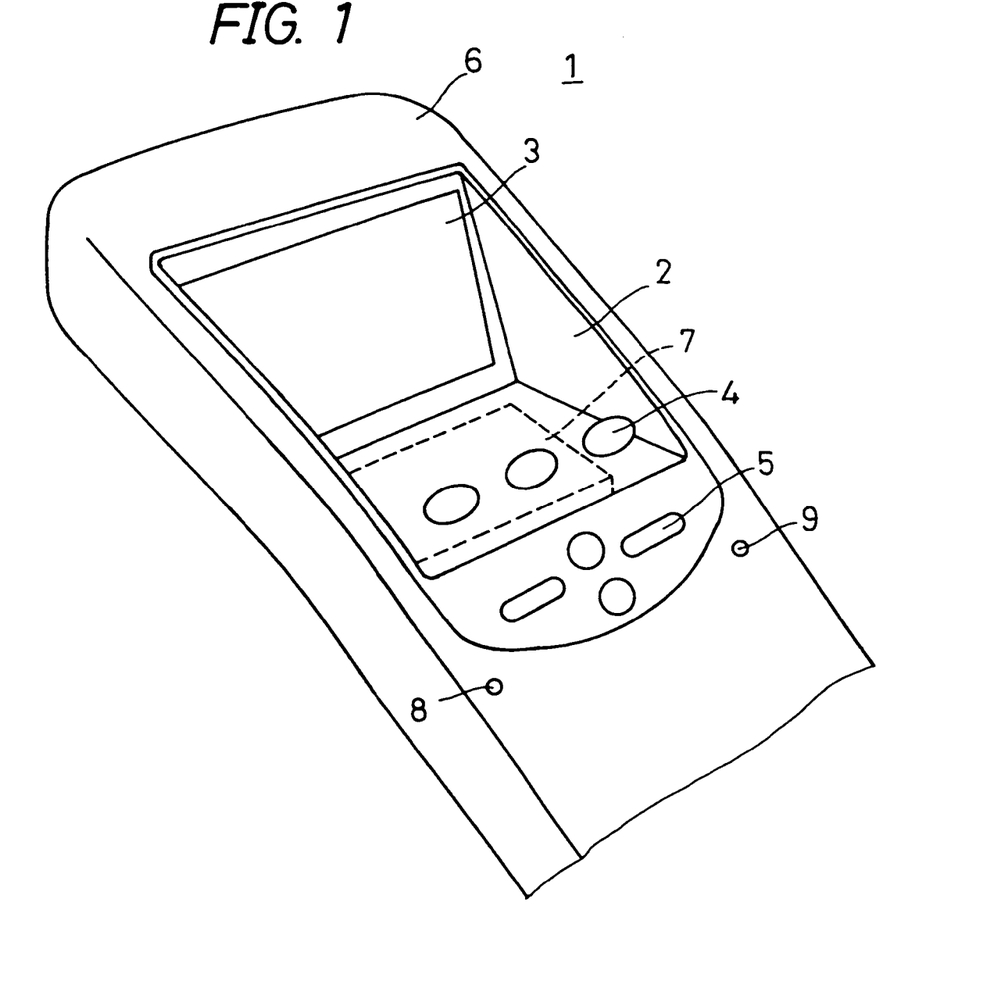
FIG. 1 is a perspective view showing the structure of the appearance of an on-board display apparatus of an embodiment of the present invention.

FIG. 1 shows a schematic structure of the appearance of an on-board display apparatus 1 as an embodiment of the present invention. The on-board display apparatus 1 includes both an image display function and an operation input function for a navigation apparatus, an audio apparatus, a television receiving apparatus and the like. The on-board display apparatus 1 of this embodiment is provided in a middle portion between the driver seat and the passenger seat in the instrument panel 6 of a vehicle, and has a transmission type display device 2 in front and an image display device 3 in back. The transmission type display device 2 can be turned to be entirely transparent or at least partially transparent. The image display device 3 is provided in back such that the image display device 3 can be seen from the portion that can be turned to be transparent. The transmission type display device 2 is provided with a function as a touch switch in which an image for operation such as a button is displayed as a touch switch display 4, an operation switch. When a finger touches that position, an input in accordance with the image for operation on the touched position is performed. In addition, a display area of the transmission type display apparatus is larger than that of the image display device 3.

A panel switch 5 or the like can be provided on the outer portion of the transmission type display device 2. The panel switch 5 can be a push button switch for frequent operation, and can be operated at any time. A control device 7 is provided inside the instrument panel 6 as a control portion or display control portion for controlling the transmission type display device 2 and the image display device 3 of the on-board display apparatus 1 to display in connection with each other. Approach sensors 8 and 9 for detecting whether an operation such as touch switching is performed from the driver seat side or the passenger seat side are provided on the driver seat side and the passenger seat side, respectively. The approach sensors 8 and 9 detect an approach of an operation object, for example, a finger for operation with infrared rays or ultrasonic waves, and it is detected whether an operation is performed from the driver seat side or from the passenger seat side, by determining which of the approach sensors 8 and 9 detected an approach of the operation object such as a finger or which of the approach sensors 8 and 9 detected the operation object such as a finger earlier.

Figure 2:
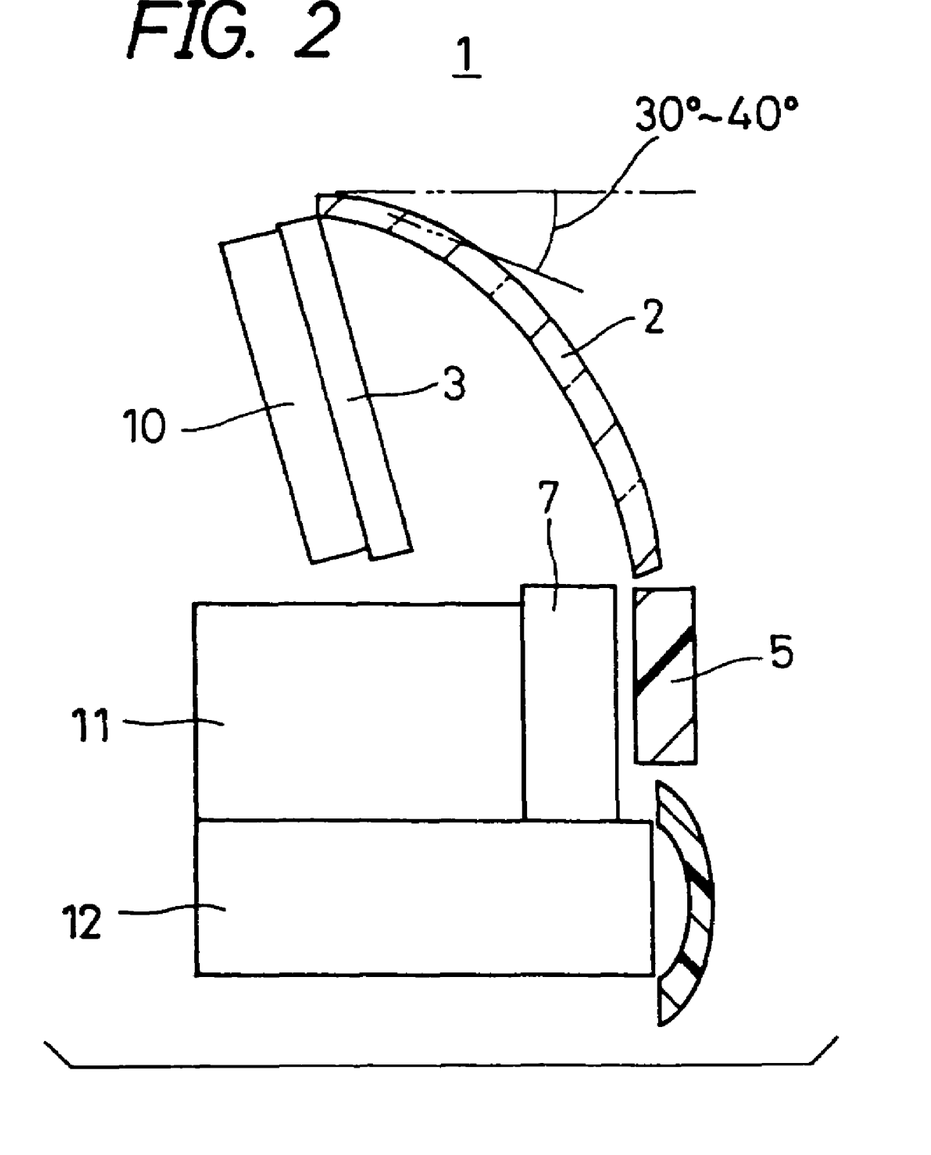
FIG. 2 is a side cross-sectional view showing a simplified structure of the on-board display apparatus of FIG. 1.

FIG. 2 is a cross-sectional view from the side face showing a schematic structure of the on-board display apparatus 1 of FIG. 1. The transmission type display apparatus 2 has a substantially curved plate-like shape, and has an inclination of an angle of about 30° to 40° with respect to a plane parallel to the floor surface of a vehicle in the upper portion, whereas the inclination angle increases approaching the lower portion. The image display device 3 is a flat display device such as a plasma display apparatus or a liquid crystal display apparatus of an active matrix system with thin film transistors (TFTs), and a rendering device 10 that drives the display device 3 to render images is provided on the back of the display device 3. A composite device 11 for a vehicle provided with composite functions of a navigation device, an audio device, a television receiving device and the like is provided below the image display device 3 and the rendering device 10. The rendering device 10 drives the display device 3 based on the image signals from the composite device 11 for a vehicle to display a desired image recording medium reproducing device 12 is provided below the composite device 11 for a vehicle. The recording medium reproducing device 12 reproduces information recorded in a recording medium such as DVD, CD or MD so that the information is utilized as map data for navigation or reproduced in the form of audio in an audio device in the composite device 11 for a vehicle, or outputs video signals to the image display device 10 as video images for reproduction and display.

Figure 3:
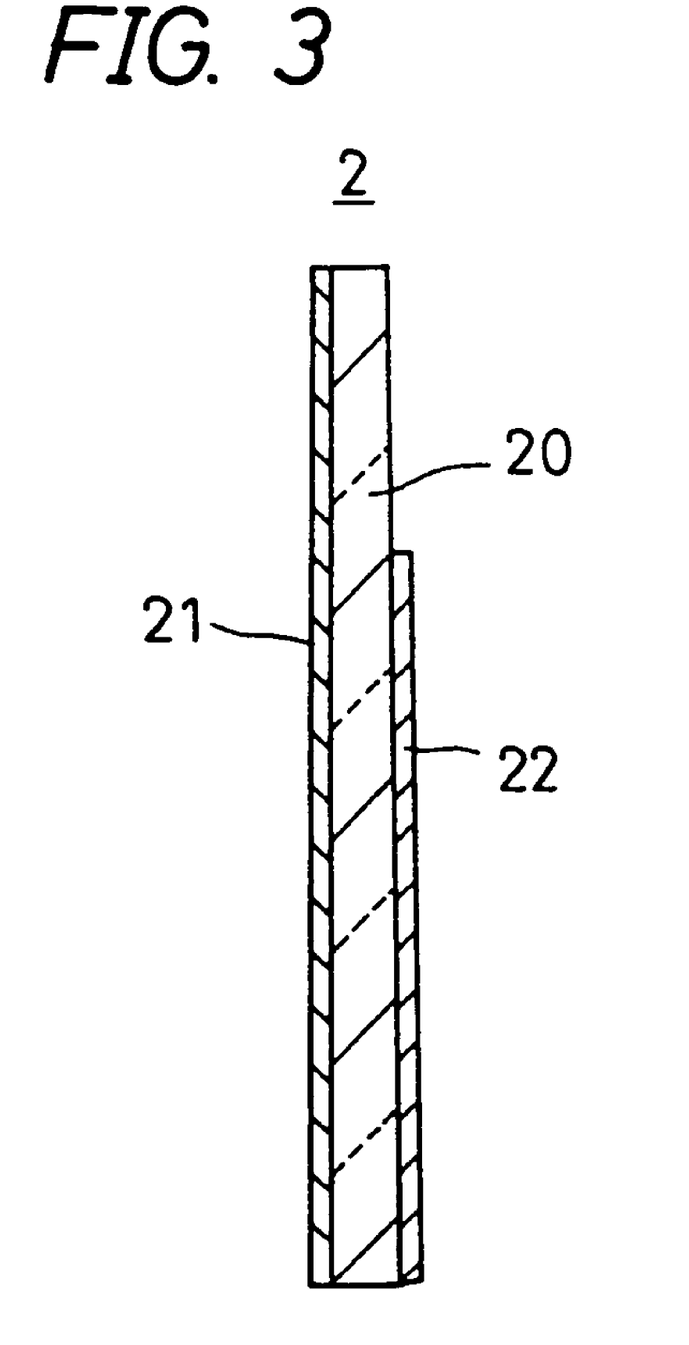
FIG. 3 is a cross-sectional view showing a schematic structure of a transmission type display device of FIG. 1.

FIG. 3 shows a schematic cross-sectional structure of the transmission type display device 2 of FIG. 1. An organic EL (Electro Luminescent) layer 21 is formed on the back surface of a transparent panel 20 such as a transparent synthetic resin or glass, and can be switched between a transparent state and an opaque state with application of a control voltage. When the shape of an electrode to which a voltage is applied is conformed to the shape of a button for touch panel and an opaque state is created, the touch switch display 4 shown in FIG. 1 can appear. Regarding the shape of the electrode, a shape that covers the entire button shape and a shape of only the contour (entire circumference or a part thereof) are possible, but the shape of the contour is more advantageous in that the visibility of the image display device 10 is not reduced in the button display state. A transparent touched position detecting sheet 22 as a touch panel element is provided at least in a portion on the surface of the transparent panel 20 so that the touched position can be detected. In place of the organic EL layer 21, a liquid crystal display layer can be used. As the touched position detecting sheet 22, for example, a resistive film type coordinate detecting sheet including a sheet switch made of two transparent sheets in which transparent switches are provided in a matrix, and two transparent resistive film sheets having resistive films in which electrodes are provided on their ends or transparent conductive sheets or the like, or an optical coordinate detector that includes a plurality of light-receiving elements and light-emitting elements that are arranged in the vertical and horizontal directions and detects the touched position based on how much of the light beams thereof are shielded can be utilized. Such structures are only examples, and the same function can be realized by other structures. For example, the organic EL layer 21 can be provided on the surface side. Furthermore, to detect the touched position, a resistive film type, an optical type, or other various dimensional position (coordinate) detecting methods such as an electrostatic type or an electromagnetic type can be used. In addition, a touch panel element is allowed to be provided inside the transmission type display device 2.

Figure 4:
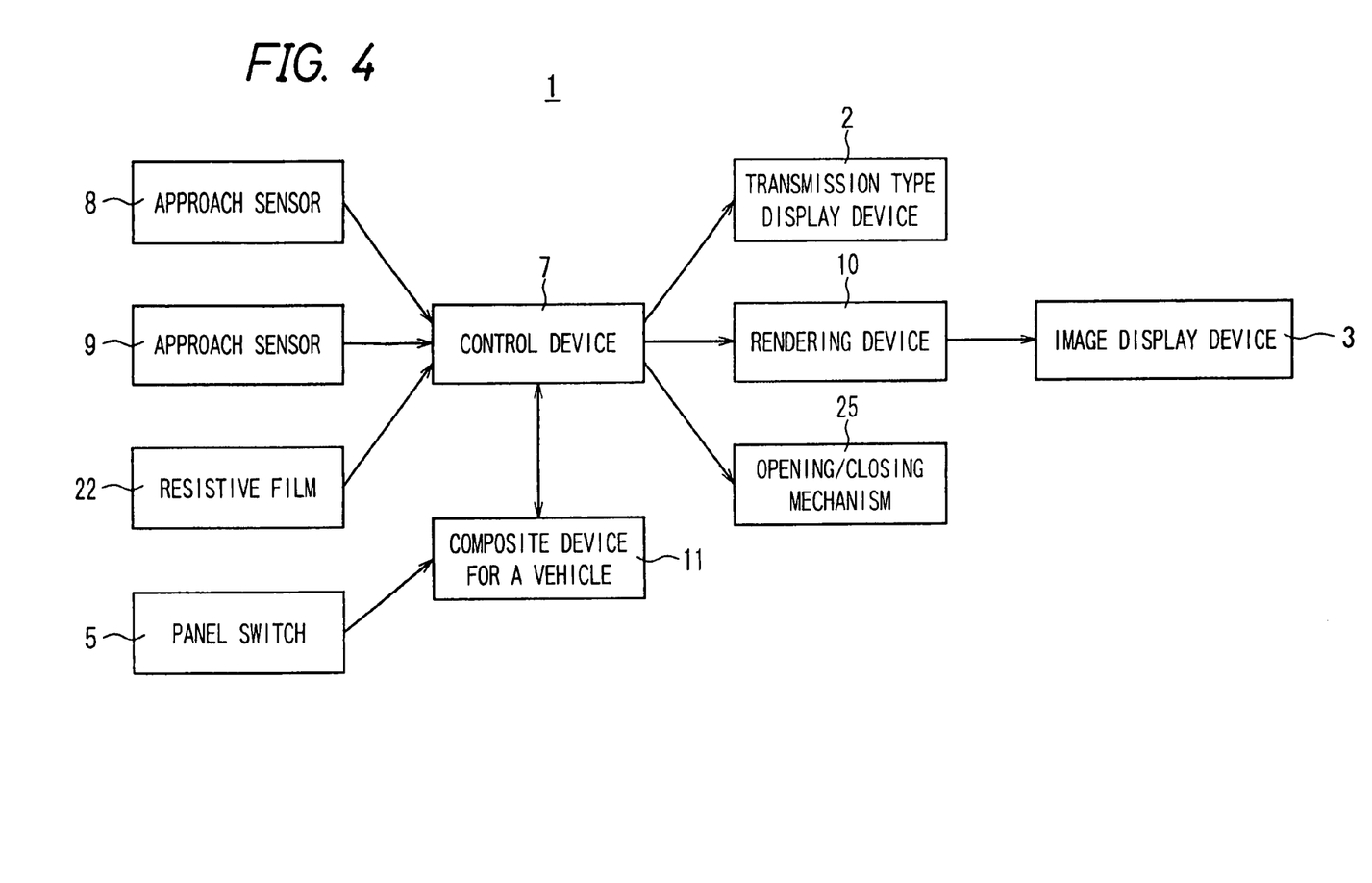
FIG. 4 is a block diagram showing a schematic electrical structure of the on-board display apparatus of FIG. 1.

FIG. 4 shows a schematic electrical structure of the on-board display apparatus 1. A control device 7 receives a detection output from the approach sensors 8 and 9, and a detection output from the touched position detecting sheet 22 so as to control image display in the transmission type display device 2 and the image display device 3 so that the function as a touch panel is realized. The operation of the entire system is controlled by transmission of signals to/from the composite device 11 for a vehicle. A panel switch 5 is connected directly to the composite device 11 for a vehicle so that the composite device 11 for a vehicle can receive an input operation with the panel switch 5.

As shown in FIGS. 1 to 4, the on-board display apparatus 1 of this embodiment is provided in the vicinity of the driver seat of a vehicle, and the transmission type display device 2, which is a substantially planar transmission type display portion that can be controlled as to whether it is in an opaque state for displaying images or a transparent state in which at least partial transparence is achieved, is provided on a front side thereof. The image display device 3 as a display portion or a rearward display portion for displaying images such that the driver or passengers of the vehicle can see through the transparent portion of the transmission type display device 2 is provided on the rear side of the position of the transmission type display device 2 that can be transparent (the entire portion can be transparent), that is, at a position that can be seen, apart from the transmission type display device 2. The touched position detecting sheet 22 is provided on the surface of the transmission type display device 2 as a touch detecting portion for detecting the touched position when there is a touch from the driver or a passenger of the vehicle. The control device 7 outputs an operation signal indicating the operation status to the composite device 11 for a vehicle in response to the touch detected output from the touched position detecting sheet 22 and controls the display of the transmission type display device 2 based on the signals from the touched position detecting sheet 22, the approach sensors 8 and 9 and the composite device 11 for a vehicle, so as to operate function the system as a touch panel.

Thus, in this embodiment, an operation input by a touch panel can be performed on the surface side of the transmission type display device 2, and the display by the image display device 3 to the rear can be seen through the transmission type display device 2 (transparent portion). Therefore, it is not necessary to operate an instruction display such as push button switches in the display of the image display device 3 to the rear, so that an effective display range on the screen can be increased and complicated control for image display can be avoided. Furthermore, since operation near the image display device 3 is unnecessary, the image display device 3 can be provided at a relatively distant position from the driver. Thus, a displayed image can be distant from the driver, and a visual range can be more distant than when it is on the surface, so that the burden on the eyes when viewing images can be reduced.

When a touch is detected by the touched position detecting sheet 22, the control device 7 controls such that a pointer is displayed on the display screen of the image display device 3 based on the detected touched position, if necessary (in the case of the operation status in which a pointer should be displayed, for example, in the operation status in which a point on a map should be designated in a navigation apparatus). The on-board display apparatus 1 of this embodiment can be touched from the outside only from the surface of the transmission type display device 2, and the display screen of the image display device 3 to the rear cannot be touched directly. In designating a specific position on a roadmap or the like displayed on the display screen of the image display device 3, when the surface of the transmission type display device 2 is touched, a pointer is displayed on the display screen of the image display device 3 to the rear of from the surface of the transmission type display device 2. The pointer is displayed in a position corresponding to the touched position, and therefore when it is necessary to designate a position on the images displayed on the image display device 3 to the rear, the position to be touched is moved onto the surface of the transmission type display device 2 and the pointer position is guided so that an exact position can be designated. The relationship between the touched position and the pointer display device is stored in a memory, and the pointer display position is determined based on the touched position and data stored in the memory.

Figure 5:
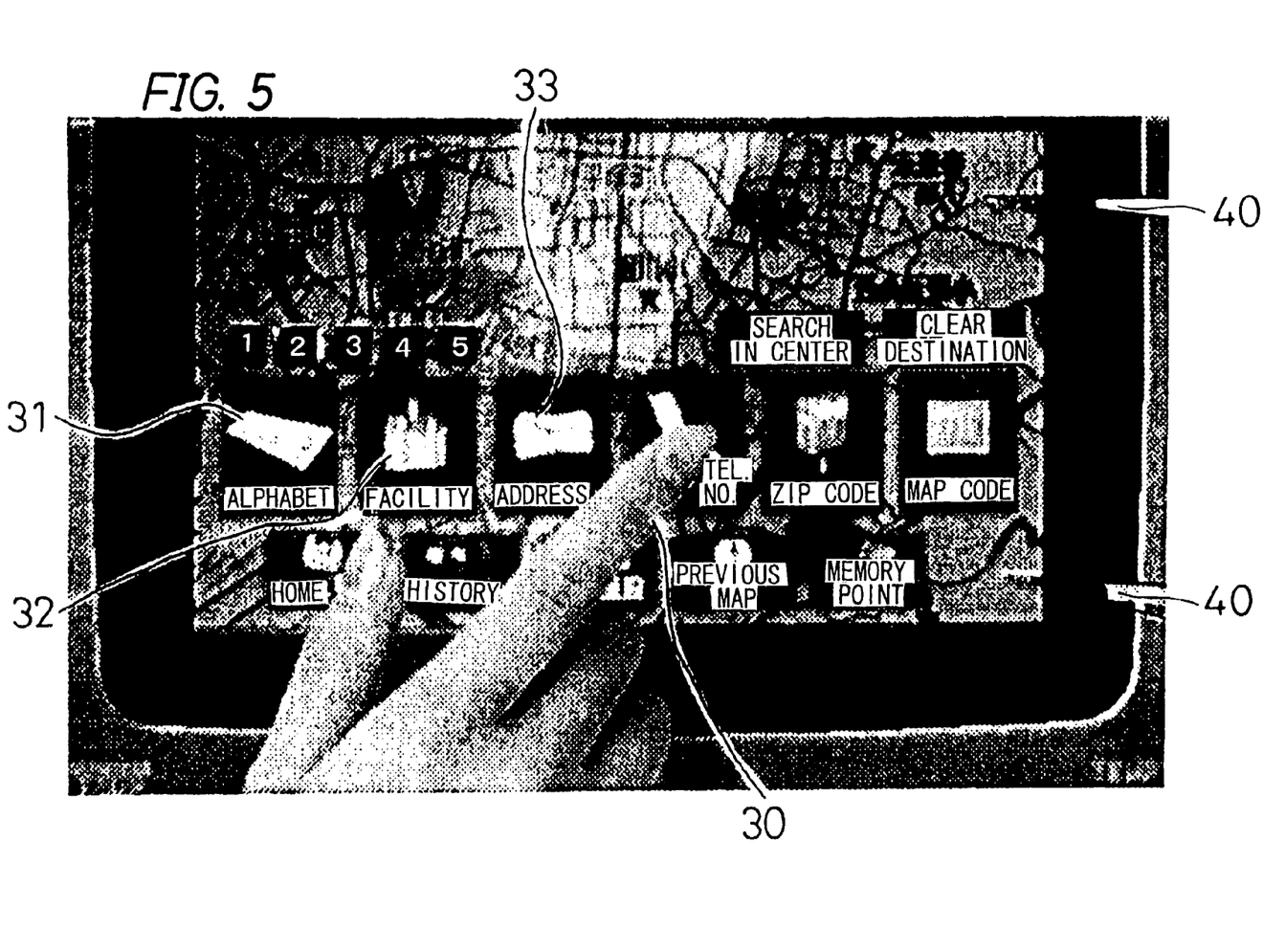
FIG. 5 is a view showing the state in which the approach of a finger is detected and floating touch switch display is performed in the on-board display apparatus of FIG. 1.

FIG. 5 shows the state in which floating displays 31, 32, 33, . . . , for touch switches are shown when a finger 30 is approaching to the surface of the transmission type display device 2. As described above, this embodiment further includes the approach sensors 8 and 9 as an approach detecting portion that detects an approach of a finger of the driver or a passenger of a vehicle. When an approach of a finger is detected by the approach sensor 8 or 9, the control device 7 displays an image for operation such as a button to be operated by the detected finger on the transmission type display device 2 in accordance with the operation status of the system at that time (for example, in a status in which a destination is to be set in a navigation apparatus). The control device 7 controls such that only when the finger 30 is approaching to the surface of the transmission type display device 2 and during a predetermined period after the finger is apart, the floating display 31, 32, 33, . . . for touch switches are displayed. Therefore, when the finger 30 does not approach, the floating display 31, 32, 33, . . . for touch switches are not displayed, and the transmission type display device 2 is transparent, so that a display image 40 of the image display device 3 to the rear can be seen well, and thus visibility can be increased. Furthermore, not only when there is an approach of the finger, but also when an operation is necessary, control is performed such that the floating display 31, 32, 33, . . . for touch switches are displayed, so that easy operation input in which the operation is guided can be performed.

Furthermore, the floating display 31, 32, 33, . . . for touch switches and the touch switch display 4 shown in FIG. 1 can be switched dynamically between the display state and the non-display state, and when control is performed such that a fade-in/fade-out in which the display gradually appears or disappear at the time of appearance and disappearance is performed, a sense of high grade can be provided. This display control can be performed by known image display processes such as control of driving voltage or control of concentration of displayed colors, depending on the system of the transmission type display device 2. When the composite device 11 for a vehicle is not operated, display control is performed such that the transmission type display device 2 is entirely opaque so that the image display device 3 cannot be seen from the outside to improve the design or add the effect of preventing theft.

In this embodiment, the approach sensors 8 and 9 the as approach detecting portion are provided on the side of the driver seat and the side of the passenger seat, respectively, so that it is also possible to detect the direction in which the finger 30 is approaching. The control device 7 determines whether the operation is performed by the driver or the passenger of the travelers in the vehicle based on the approach direction of the finger 30 detected by the approach sensor 8 or 9, and controls such that the images displayed on at least one of the transmission type display device 2 and the image display device 3 is switched between for the driver and. the passenger, based on the determined results and the operation status of the system such as the composite device 11 for a vehicle.

In other words, the driver seat is in a direction with respect to the position in which the on-board display apparatus 1 is provided that is predetermined for each vehicle, so that when the approach direction of the finger 30 approaching for operation is detected, it is easily determined whether the operation is performed by the driver or the passenger. In at least one of the transmission type display device 2 and the image display device 3, images are switched between for the driver or the passenger, based on the determined results, so that appropriate images for each of them can be displayed. For example, for the driver, only the minimum image display may be displayed so that the driver can concentrate on driving. For the passenger, images may be displayed in colorful representation to show as much information as possible.

In the embodiment as described above, the transmission type display device 2 is assumed to be fixed, but can be opened and closed, for example, with a hinge provided in an upper portion of FIG. 2, for example, for cleaning the internal portion. Furthermore, a port through which a recording medium is inserted and removed may be provided on the back of the transmission type display device 2, and the transmission type display device 2 is opened so that a recording medium can be inserted and removed.

In the embodiment, the operation object for operation is a finger of the operator. Instead, other operation objects such as an operation pen may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. All changes which come within the meaning and the range of equivalency of the claims are therefore intended to be embraced therein.

What is claimed is:

1. A vehicle mounted display apparatus comprising:
    a transmission type display portion that is operable to transmit light there through and display images thereon, said transmission type display portion having a touch panel function, and said transmission type display portion being mounted at a first location in a vehicle;
    a rearward display portion operable to display images that are different from the images displayed on said transmission type display portion, said rearward display portion being mounted at a second location in the vehicle rearwardly of said transmission type display portion, said rearward display portion being mounted such that a gap is formed between said transmission type display portion and said rearward display portion and such that the images displayed on said rearward display portion can be seen through said transmission type display portion by a viewer in the vehicle; and
    a control portion for controlling said transmission type display portion and said rearward display portion in response to finger approach toward or finger touch of said transmission type display portion.

2. The vehicle mounted display apparatus of claim 1, wherein said transmission type display portion comprises a surface with a touch panel element thereon.

3. The vehicle mounted display apparatus of claim 1, wherein said transmission type display portion comprises an internal touch panel element.

4. The vehicle mounted display apparatus of claim 1, wherein said transmission type display portion includes a touch panel such that a display of said rearward display portion is changed depending on a touched position on said touch panel.

5. The vehicle mounted display apparatus of claim 4, wherein said touched position is in the form of a button.

6. The vehicle mounted display apparatus of claim 5, wherein said button is displayed in a position which does not prevent view of said rearward display portion through said transmission type display apparatus.

7. The vehicle mounted display apparatus of claim 1, wherein said transmission type display portion includes a touch panel and said control portion is operable to control said rearward display portion such that a pointer is displayed by said rearward display portion in accordance with operation of said touch panel.

8. The vehicle mounted display apparatus of claim 1, further comprising an approach detecting portion operable to detect approach of an operation object, wherein said control portion is operable to change an image displayed on at least one of said transmission type display portion and said rearward display portion when said approach detecting portion detects the approach of the operation object.

9. The vehicle mounted display apparatus of claim 8, wherein said approach detecting portion can detect an approach direction of the operation object.

10. The vehicle mounted display apparatus of claim 8, wherein said approach detecting portion is operable to detect whether the operation object approaches from a direction from a passenger's seat or a direction from a driver's seat.

11. The vehicle mounted display apparatus of claim 1, wherein said transmission type display portion has a curved surface.

12. The vehicle mounted display apparatus of claim 1, wherein said transmission type display portion covers said rearward display portion such that said rearward display portion is visible.

13. The vehicle mounted display apparatus of claim 1, wherein said vehicle mounted display apparatus is located in a middle portion between a passenger's seat and a driver's seat.

14. The vehicle mounted display apparatus of claim 1, wherein said control portion is operable to selectively display an operation switch on said transmission type display portion.

15. The vehicle mounted display portion of claim 1, wherein said transmission type display portion has a curved plate shape and an inclination angle, with respect to a floor surface of the vehicle, that is larger at a lower portion of said transmission type display portion than at an upper portion of said transmission type display portion.

16. The vehicle mounted display portion of claim 1, wherein said transmission type display portion has a curved plate shape and said rearward display portion has a flat plate shape.

17. The vehicle mounted display apparatus of claim 1, wherein said transmission type display portion comprises an organic electro luminescent layer and said rearward display portion comprises a liquid crystal display apparatus.

18. The vehicle mounted display apparatus of claim 1, wherein a display area of said transmission type display portion is larger than that of said rearward display portion.

19. The vehicle mounted display apparatus of claim 1, wherein a portion of said transmission type display portion is transparent so that said rearward display portion can be seen there through.

20. The vehicle mounted display apparatus of claim 1, wherein said control portion is operable to control said transmission type display portion to cause operation switches to appear or disappear gradually on said transmission type display portion.

21. The vehicle mounted display apparatus of claim 1, wherein said control portion is operable to control said transmission type display portion to be selectively opaque so that said rearward display portion cannot be seen.

22. The vehicle mounted display apparatus of claim 1, wherein said transmission type display portion has one end pivotally connected to the vehicle as a supporting point therefor.

23. A vehicle mounted display apparatus comprising:
   a transmission type display portion operable to transmit light there through and display images thereon, said transmission type display portion having a touch panel function and a transparent surface on which the images can be displayed, and which is mounted at a first location in a vehicle;
   a rearward display portion operable to display images that are different from the images displayed on said transmission type display portion, said rearward display portion being positioned at a second location in the vehicle so as to be spaced rearwardly of said transmission type display portion, said rearward display portion being mounted such that a gap is formed between said transmission type display portion and said rearward display portion and such that a display of said rearward display portion can be provided to a rearward part of said transmission type display portion such that the images displayed on said rearward display portion can be seen through said transmission type display portion; and
   a control portion for controlling displayed content of said transmission type display portion and said rearward display portion in response to finger approach toward or finger touch of said transmission type display portion.

24. The vehicle mounted display apparatus of claim 23, wherein said transmission type display portion includes a touch panel such that a display of said rearward display portion is changed depending on a touched position on said touch panel.

25. The vehicle mounted display apparatus of claim 24, wherein said touched position is in the form of a button.

26. The vehicle mounted display apparatus of claim 25, wherein said button is displayed in a position which does not prevent view of said rearward display portion through said transmission type display portion.

27. The vehicle mounted display apparatus of claim 23, wherein said transmission type display portion includes a touch panel and said control portion is operable to control said rearward display portion such that a pointer is displayed by said rearward display portion in accordance with operation of said touch panel.

28. The vehicle mounted display apparatus of claim 23, further comprising an approach detecting portion operable to detect approach of an operation object, wherein said control portion is operable to change an image displayed on at least one of said transmission type display portion and said rearward display portion when said approach detecting portion detects the approach of the operation object.

29. The vehicle mounted display apparatus of claim 28, wherein said approach detecting portion can detect an approach direction of the operation object.

30. The vehicle mounted display apparatus of claim 28, wherein said approach detecting portion is operable to detect whether the operation object approaches from a direction from a passenger's seat or a direction from a driver's seat.

31. An on-board display apparatus mounted on a vehicle, comprising:
   a transmission type display portion mounted at a forward position in the vehicle and operable to display images thereon;
   a rearward display portion mounted at a rearward position of the vehicle which is rearward of said transmission type display portion and spaced apart from said transmission type display portion, said rearward display portion being mounted such that a gap is formed between said transmission type display portion and said rearward display portion, and said rearward display portion being operable to form a display of images that are different from the images displayed on said transmission type display portion such that the images displayed on said rearward display portion can be seen through said transmission type display portion;
   a display control portion operable to display a switch operation guide in said transmission type display portion;
   a touch detecting portion provided in said transmission type display portion for detecting a position touched by an operator; and
   an operation signal output portion for outputting an operation signal indicating an operation content based on a display state of said display control portion and a touch detection output from said touch detecting portion;
   wherein said transmission type display portion is operable, in response to finger approach toward or finger touch of said transmission type display portion, to function as a touch panel and cover said rearward display portion such that an image of said rearward display portion is visible.

32. The on-board display apparatus of claim 31, wherein said display control portion is operable to control said rearward display portion to display a pointer so that the pointer is in a position corresponding to the touched position when said touch detecting portion detects a position touched by the operator.

33. The on-board display apparatus of claim 31, further comprising an approach detecting portion for detecting approach of an operation object, wherein said display control portion is operable to display the switch operation guide in said transmission type display portion when said approach detecting portion detects the approach of the operation object.

34. The on-board display apparatus of claim 33, wherein said approach detecting portion is operable to detect a direction of approach of the operation object, and said display control portion is operable to switch images to be displayed in at least one of said transmission type display portion and said rearward display portion based on the direction of approach of the operation object detected by said approach detecting portion.

* * * * *